Dec. 12, 1944. A. L. RUTHVEN 2,364,821
PARACHUTE TOYS
Filed Jan. 14, 1942 4 Sheets-Sheet 1

INVENTOR.
Alfred L. Ruthven,
BY M. H. Laughridge
Attorney

Dec. 12, 1944.  A. L. RUTHVEN  2,364,821
PARACHUTE TOYS
Filed Jan. 14, 1942.  4 Sheets-Sheet 2
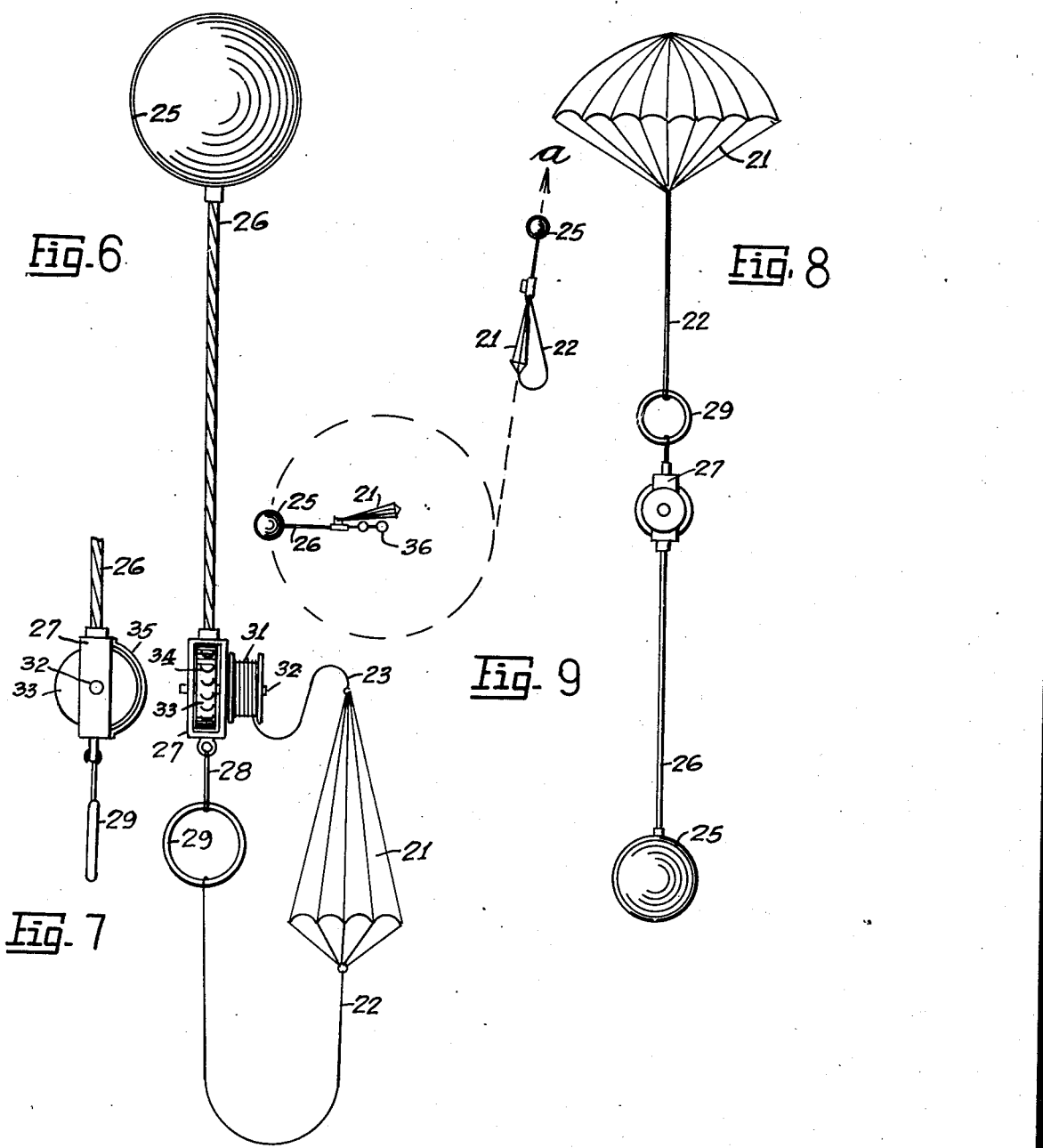
INVENTOR.
Alfred L. Ruthven,
BY M. H. Loughridge, Attorney.

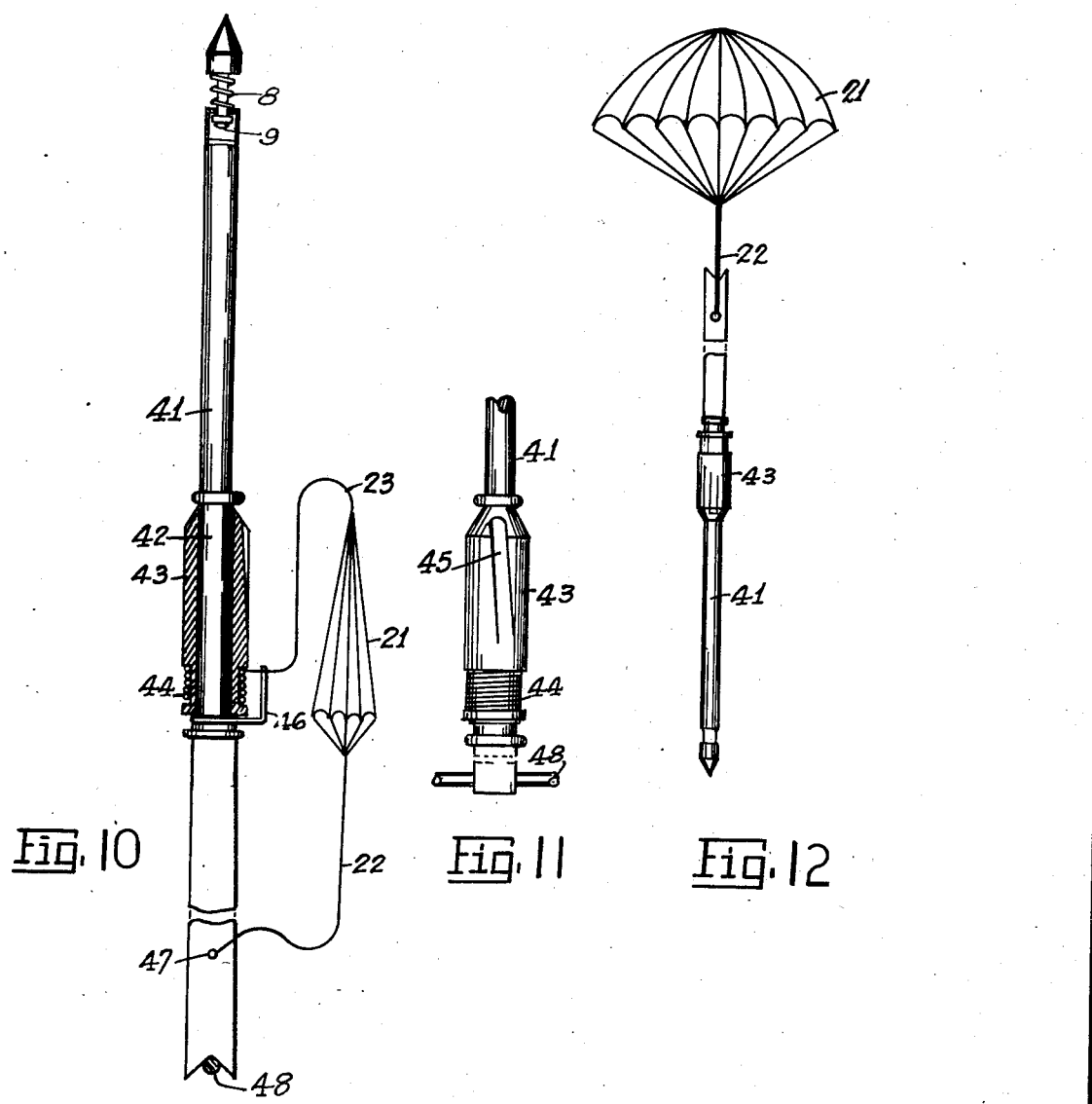

Dec. 12, 1944. A. L. RUTHVEN 2,364,821
PARACHUTE TOYS
Filed Jan. 14, 1942 4 Sheets-Sheet 4
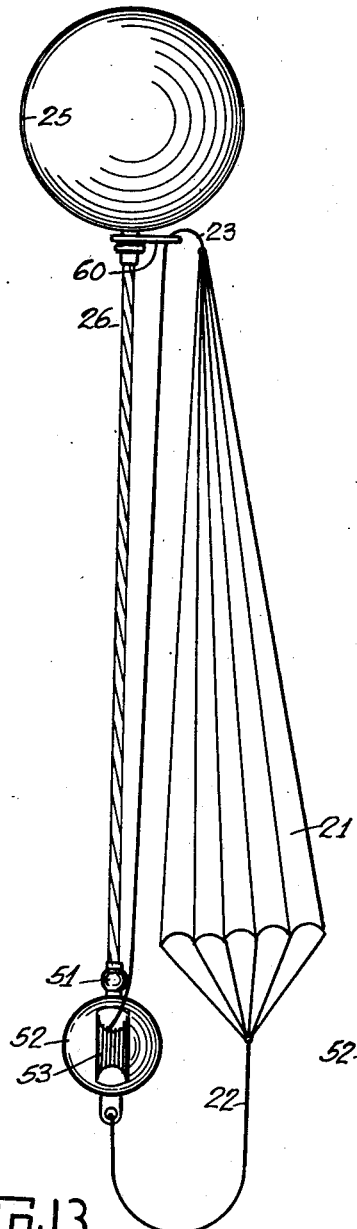
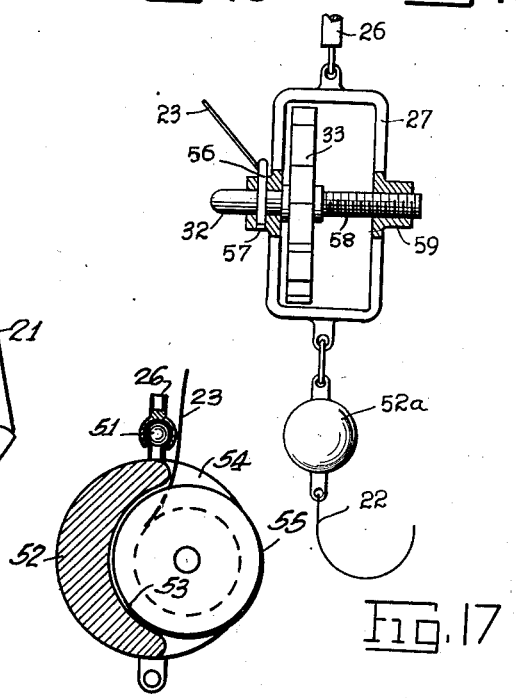
INVENTOR.
Alfred L. Ruthven,
BY
ATTY.

Patented Dec. 12, 1944

2,364,821

UNITED STATES PATENT OFFICE 2,364,821

PARACHUTE TOY

Alfred L. Ruthven, Binghamton, N. Y., assignor to Louis R. Ruthven, Binghamton, N. Y.

Application January 14, 1942, Serial No. 426,761

12 Claims. (Cl. 46—86)

This invention relates to a parachute toy of the type which is projected into the air and in the course of flight a parachute is opened to retard the falling action of the device. Its object is to provide a device adapted to be projected into the air and to which a parachute is attached, the parachute remaining collapsed during the flight and being opened after a predetermined interval to suspend the device as it falls. Another object of the invention is to provide a device of this type having a parachute attached by its crown to be pulled by the device during flight and also attached by its base to the device so that it opens when the crown attachment is released and acts as a parachute for the falling device, and another object of the invention is to provide a device for projecting into the air including a parachute with a releasable attachment for bringing the parachute into operation during flight.

These and other objects of the invention will be more particularly understood from the following specification and the accompanying drawings, showing three types of the device, and in which:

Fig. 6 is another form of the device comprising a weight which is projected by a twirling action;

Fig. 7 is a detail of the timing mechanism in Fig. 6 shown at right angles to Fig. 6;

Fig. 8 shows the device in Fig. 6 in the falling position with the parachute open, and Fig. 9 is a diagram of the twirling projection of the device.

Fig. 10 shows the invention applied to a narrow, partly sectioned;

Fig. 11 is another view of part of Fig. 10, and

Fig. 12 shows the arrow in Fig. 10 in the falling position with the parachute open.

Fig. 13 is another form of the device comprising a weight to be projected, as in Fig. 6, but showing a different structure for hand hold, and for reel and attachment for the crown connection.

Fig. 14 is a detail view, partly in section, of the hand hold, reel and associated parts shown at Fig. 13.

Fig. 15 is a front elevation, partly in section, of a modified form of crown-connection releasing mechanism.

Fig. 16 is a side view of the release mechanism shown at Fig. 15.

Fig. 17 is a view of the release shown at Fig. 15 illustrating its use as a part of the device in the form shown at Fig. 13.

Figure 1:
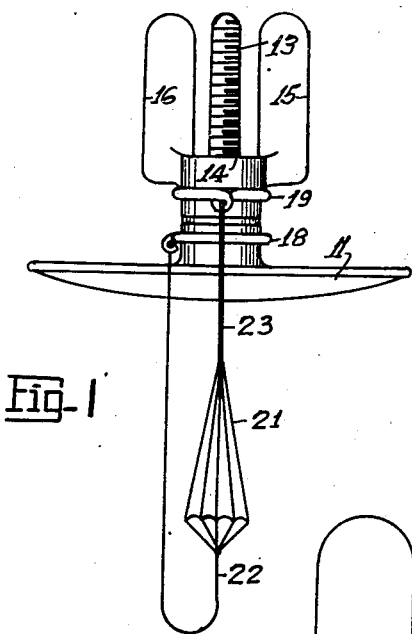
Fig. 1 is an elevation of a disc type parachute toy embodying the invention.

This invention comprises a weighted object suitable for projecting into the air by hand, or other available means, and to which a parachute is attached by a short attachment to its crown and by a longer attachment to its base. The short attachment pulls the parachute along with the object in a collapsed position but, during the flight, the short attachment is released, permitting the long attachment to become effective which inverts the parachute and quickly brings the flight of the object to a stop as the parachute retards its fall.

Several methods are shown for releasing the crown attachment of the parachute. All of these methods involve a time interval which is modified by the flight of the object through the air in a lineal direction. The time interval can readily be varied so that this release will become effective coincident with the object attaining a suitable height. When the parachute opens the flight of the object is retarded and the falling action begins subject to the parachute control.

In the drawings, 11 is a disc provided with a central projecting stem 12 at right angles to the plane of the disc and threaded at its outer end 13 with a screw thread. A socket 14 provided with the air vanes 15 and 16 screws on the thread 13 and seats on the soft rubber ring 17. The disc 11 is provided with an attaching ring 18 and the socket 14 is provided with another attaching ring 19.

The parachute 21, shown in the folded position in Fig. 1, is attached by the crown connection 23 to the ring 19 and to the socket 14, while the base of the parachute is attached by the longer connection 22 with the ring 18 on disc 11.

Figure 2:
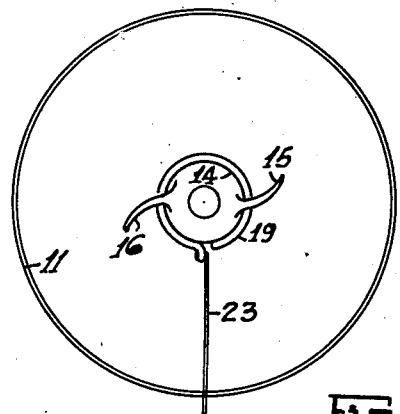
Fig. 2 is a top plan view of Fig. 1.
Figure 3:
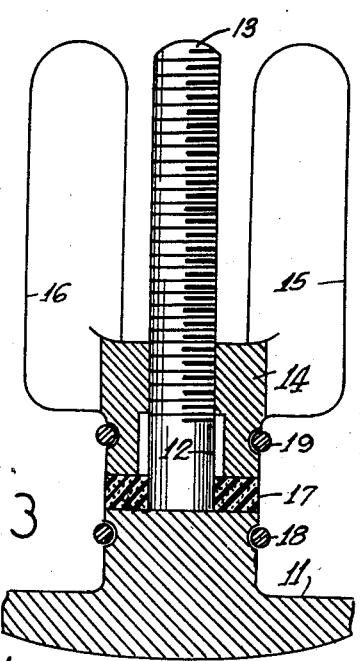
Fig. 3 is a sectional elevation of Fig. 1.
Figure 4:
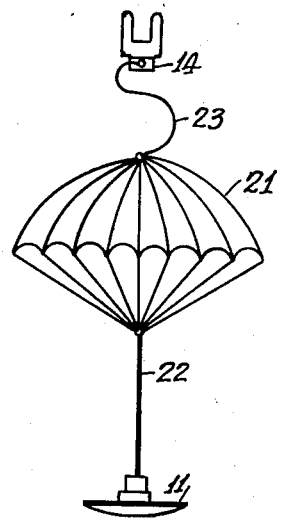
Fig. 4 shows the parachute in action retarding the fall of the device.
Figure 5:
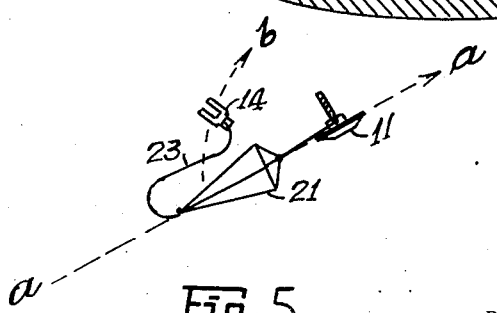
Fig. 5 is a diagram showing the operation of the device in flight.

The disc is projected by throwing it into the air as indicated in the diagram, Fig. 5. The disc usually receives a spinning action as it is thus projected, which maintains it in a definite plane. The vanes 15 and 16, Fig. 2, are acted upon by the air due to the lineal motion of the disc which causes a rotation of socket 14 on the threaded stem 13. This rotation is in the direction that unscrews the socket 14 from the stem 13 and releases this socket with the ring 19 from the disc 11 after a predetermined interval of flight which is determined by the pitch of the thread on 13. The disc follows the course indicated by line a—a, Fig. 5, while the socket 14 in releasing from the disc moves at right angles to the plane of the disc and when released tends to follow the course indicated by line b. As soon as the socket 14 is released from the stem 13 the pulling action on the crown of the parachute is released and the air resistance reverses the parachute so that it is opened to retard further flight and to become effective as a parachute.

In the construction of this device the soft rubber ring 17, between the socket and the base, prevents these parts from "freezing" and facilitates starting the socket to unscrew. The socket and the vanes 15 and 16 should be made of light material, preferably of light metal or a molded plastic, the weight of which is readily overcome by the much larger weight embodied in the disc 11. The disc should, preferably, be balanced so that the projecting stem will not tend to deflect its straight movement.

The twirling device in Fig. 6 comprises the weight 25, secured by the flexible connection 26 to the frame 27 and by the connection 28 to the ring 29 which is used by the operator as indicated in Fig. 9 at 29 to twirl the weight 25 in a circle and release it to project vertically on the line a. The frame 27 carries a wind wheel 33, provided with vanes 34 to engage the wind during the straight flight. This wheel is mounted on the shaft 32 upon which the reel 31 is also mounted. The cord 23 from the crown of the parachute 21 is wound on the reel 31 and the base cord 22 is connected to ring 29. A shield 35, secured to frame 27, shields one side of the wind wheel 33 so that in straight flight it is rotated by the wind in one direction.

In this application of my invention the wind wheel 33 is used as a retarding device to retard the rotation of reel 31 and the release of cord 23. When the device is twirled prior to projection, the wheel 33 is moving in a circle and there is no tendency to cause its rotation. Further the wheel is located close to the ring 29, that is to the center of rotation and moves relatively slowly compared with weight 25.

When the device is projected in a lineal direction the air resistance to the parachute applies a pull to the cord 23 to rotate the reel 31. This is retarded, first by the inertia of the wheel 33 and then, as this wheel develops speed, the vanes 34 on its surface are acted upon by the air tending to move it in a reverse direction to the torque applied by reel 31, thus retarding the rotation of the reel. The cord 23 engages the reel 31 by friction and as it approaches the end of the winding it slips off the reel, thereby permitting the parachute to be inverted and to open as in Fig. 8. The extent of the winding on reel 31 determines the time interval of the release of cord 23.

In the arrow construction in Figs. 10, 11 and 12, the arrow 41 has a shank 42 upon which the sleeve 43 is rotatably mounted and this sleeve is provided with a reel 44 for receiving the cord 23 which is guided by the arm 46. An eye 47, at the base of the arrow, is connected to the bottom cord 22 and the bow-string is indicated by 48. The sleeve 43 is provided with inclined weather vanes 45 which are acted upon by the air during the flight to retard the rotation of sleeve 43 caused by unreeling the cord 23 to increase the time interval necessary for releasing 23 and making 22 effective to open the parachute as in Fig. 12. The point of the arrow is provided with a spring end 8 which may have a detonator 9 that is exploded when the point strikes the ground.

In the twirling device in Figs. 13 and 14, the ball 52 is held in the hand of the operator and is connected to the cord 26 by a universal joint at 51. The reel 53 is enclosed in the ball and upon this reel the crown cord 23, is wound after passing through an eye at 60, close to the weight 25. The reel 53 is inserted in a slot at 54 in the ball and is eccentric to the ball so that the edge projects at 55.

The cord is wound on the reel by rotating the edge 55 which is exposed for this purpose. There is some tendency for the pull on the crown cord 23, as the device is twirled to unwind the reel, but this is prevented by the operator placing the thumb on the exposed edge 55 so that unwinding cannot start until the device has been projected.

A modified form of mechanism for attachment and release of the crown connection 23 is illustrated at Figs. 15 and 16 and the use of this mechanism in the parachute toy is illustrated at Fig. 17 where it is shown in association with a device of the form illustrated at Fig. 13. The handhold ball is indicated at 52a. In this mechanism a latch is provided which holds the crown cord positively until it is unlatched. In this construction, the wind wheel 33 carrying stem 32 is affixed to the screw shaft 58 which screws into socket 59 in the frame 27. This wheel is rotated by the air pressure on its vanes as the device is in flight and its rotation screws shaft 58 through socket 59 to the right carrying wheel 33 to the right until the stem 32 is withdrawn from the lower hole in the latching plate 56 thus permitting the parachute attached to cord 23 to pull latch plate 56 from slot 57 of the frame. The distance of the wheel from the right side of the frame may be varied to vary the time in which the latch will release. A funnel may be provided at 61 to direct the air stream to the wind wheel 33.

Having thus described my invention, I claim:

1. In a parachute toy, a disc having a central stem with a screw thread thereon, a socket screwed on said stem having air vanes projecting at right angles to the plane of the disc, a parachute having its crown attached to said socket and its base attached to said disc and arranged so that in flight the parachute remains closed and when the socket is unscrewed by the action of the air on the vanes as it is projected, the parachute is opened to retard the fall of the disc.

2. In a parachute toy, a disc having a central stem, projecting at right angles to the plane of the disc, a member secured to said stem, a parachute having its crown attached to said member and its base attached to said disc, means for detaching said member from said stem when the disc is in flight, said parachute remaining closed when it is pulled by said member and opening to retard the fall of the disc when it is pulled by said disc.

3. In a parachute toy, a device adapted to be projected into the air, a member carried by said device, a parachute having its crown engaged to said member for pulling the parachute in a closed condition during flight, said member being rotatable relative to said device and being adapted to release said crown upon rotation of said member to a predetermined extent and wind engaging means carried by said member adapted to affect the speed of rotation of the member, said parachute having its base secured to said device for opening the parachute when it is pulled by said device.

4. In a parachute toy, a disc having a central screw stem projecting at right angles to the plane of the disc, said disc being weighted so that it may be thrown into the air, a screw socket for said stem with air vanes thereon, said socket being relatively light, a parachute having its crown connected to said socket so as to pull the parachute in a closed position during the flight of the disc, and having its base connected to said disc, said socket being unscrewed by the action of the air on the vanes during flight to permit the parachute to open and support the disc when falling.

5. In a parachute toy, a weight with a twirling cord attached thereto for projecting the weight, a frame in said cord having a wind wheel and a reel rotated by the wind wheel, a parachute having a cord attached to its crown wound on said reel, and a second cord secured to its base attached to said weight, so arranged that in flight the parachute is pulled in a closed position from the crown and when the cord is unreeled it is opened to retard the fall of the weight.

6. In a parachute toy, a weight with a twirling cord attached thereto for projecting the weight, a frame in said cord having a reel, a parachute having a cord attached to its crown wound on said reel, and a second cord secured to its base attached to said weight, so arranged that in flight the parachute is pulled in a closed position from the crown until the cord is unreeled and is opened thereafter to retard the fall of the weight, and means for retarding the unwinding of said reel.

7. In a parachute toy, a weight with a twirling cord attached thereto for projecting the weight into the air, a frame in said cord, a wind wheel having vanes in said frame and a reel secured to said wheel and rotating therewith, a parachute having a cord attached to its crown wound on said reel and a second cord secured to its base attached to said weight, so arranged that in flight the parachute remains closed until the cord is unreeled and is then opened to retard the fall of the weight and means for shielding the vanes of part of said wind wheel so that its rotation is retarded by the air when in flight.

8. In a parachute toy, a device to be projected into the air, a rotating member with a reel thereon mounted on said device, air vanes on said rotating member to modify its rotation when in flight, a parachute having a cord attached to its crown and wound on said reel and a second cord secured to its base and attached to said weight, so arranged that in flight the parachute is pulled in a closed position from the crown until the cord is unreeled when the parachute is opened to retard the fall of the weight.

9. In a parachute toy, a device to be projected into the air by a twirling motion comprising a weight with a cord, secured at the opposite end to a ball held by the operator, a reel in said ball, a parachute, a cord attached to said parachute and wound on said reel and means whereby the operator can hold said reel against unwinding until the device is projected.

10. In a parachute toy, a device to be projected into the air comprising a wind wheel, a latched secured by said wheel to the projected device, a parachute, a cord attached to said parachute and secured by its free end to said latch, and means for releasing the latch by the rotation of said wheel.

11. In a parachute toy, a device adapted to be projected into the air, a toy parachute detachably engaged at its crown to said device and having its base connected with said device, vane means carried by the device and adapted for operation responsive to air resistance and means engaging the parachute crown to the device and operable, responsive to operation of the vane means, to detach the crown.

12. In a parachute toy, a device to be projected into the air, a rotating member mounted on said device, a parachute having a cord secured to its crown and attached to said member and another cord attached to its base and to said device, the member being adjustable and affected by the flight of the device to vary the time during the flight at which the crown connection will be released whereupon the parachute will open and descend carrying the device.

ALFRED L. RUTHVEN.